March 13, 1934.  E. W. BOWERS  1,950,472
LAWN MOWER OR TRIMMER
Filed Dec. 5, 1932
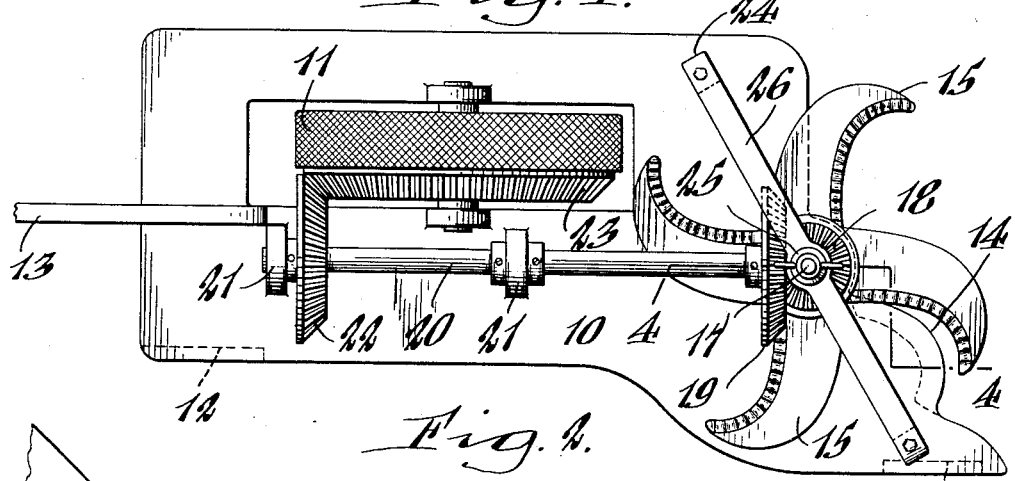
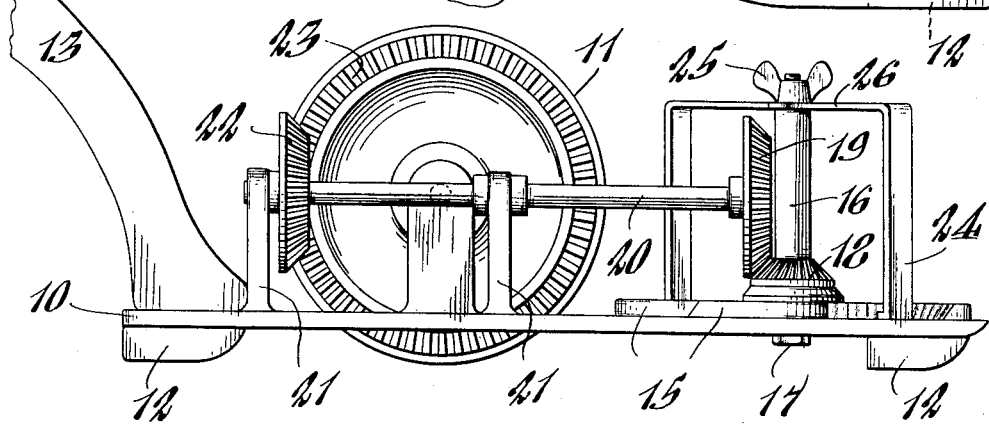
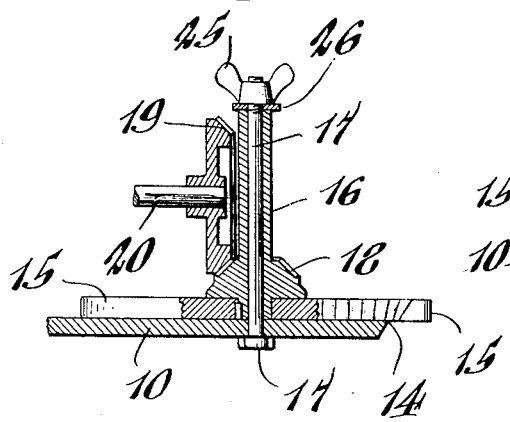
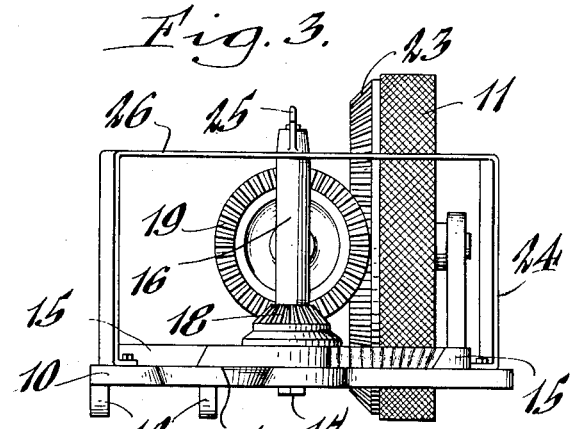
Inventor,
Edward W. Bowers,
by Walter P. Guyer
Attorney.

Patented Mar. 13, 1934

1,950,472

UNITED STATES PATENT OFFICE 1,950,472

LAWN MOWER OR TRIMMER

Edward W. Bowers, Oakfield, N. Y.

Application December 5, 1932, Serial No. 645,781

3 Claims. (Cl. 56—255)

This invention relates generally to lawn mowers but more particularly to a tool for trimming the edges of the lawn.

It is one of the objects of this invention to provide a tool of this character which is simple, compact and inexpensive in construction, and which is durable and efficient in operation.

Another object is the provision of an edge-trimming tool which is convenient to use and easy to operate, and whose parts are so organized and arranged as to be not liable to get out of order.

In the accompanying drawing:—Figure 1 is a top plan view of the lawn trimming tool embodying my invention. Figure 2 is a side elevation thereof. Figure 3 is a front end view of the same. Figure 4 is a fragmentary longitudinal section taken on line 4—4, Figure 1.

Similar characters of reference indicate corresponding parts throughout the several views.

In the preferred embodiment of the invention shown in the drawing, the same comprises a frame for supporting the operative parts of the mover or edge trimmer, the frame consisting of a base or platform 10 which is provided adjacent one side thereof and substantially midway of its front rear ends with a ground-engaging wheel 11 and which is provided at its opposite side and adjacent the ends thereof with runners or skids 12, whereby the platform is supported in a substantially horizontal position as it travels over the ground. A suitable handle 13 for pushing the trimmer over the lawn is provided which extends upwardly and rearwardly from the platform. At its front end and between the longitudinal edges thereof, the platform 10 has a cutting edge 14 which is preferably curved convexly, as shown in Figure 1, being curved transversely and thence rearwardly of the platform.

Cooperating with the fixed cutting edge 14 is a relatively movable cutter mounted to revolve on a vertical axis and consisting of a plurality of substantially radial blades 15 which revolve over the cutting edge 14 to produce a shearing cut. This cutter is keyed or otherwise secured to an upright shaft 16 which is in turn rotatably mounted on a stud or bolt 17 rising from the platform 10. Applied to this shaft is a pinion 18 which meshes with a gear 19 mounted on the front end of a horizontal shaft 20 disposed lengthwise of the machine and journaled in appropriate bearings 21 secured to the platform. At its opposite or rear end, the shaft 20 carries a gear 22 which meshes with a gear 23 applied to the ground-engaging wheel 11. As shown in Figures 2 and 4, the shaft-receiving stud 17 is supported at its upper end in a brace member 24 which is substantially U-shaped and which is bolted or otherwise secured at its lower end to the platform 10.

By this construction, as the tool is pushed over the lawn to trim the edges thereof, say adjoining the sidewalk or like places, the ground-engaging wheel 11, through the gearing 23, 22, 19 and 18, transmits motion to the revolving cutter 15, so that its cutting edges move toward the cutting edge 14 on the platform to effect a shearing cut of the grass or other material to be trimmed. As seen in Figure 4, the cutting edge 14 is preferably inclined downwardly, while the cutting edges of the cutter blade 15 are similarly inclined or beveled and are preferably corrugated for the purpose of increasing the shearing or cutting action.

For the purpose of adjusting the rotatable cutter 15 relative to the companion stationary cutting edge 14, and for maintaining the complementary cutting edges sharp, I preferably provide the upper end of the stud 17 with an adjusting or wing nut 25 which bears at its bottom against the top side of the cross member 26 of the brace 24.

I claim as my invention:—

1. A lawn trimming tool, comprising a frame including a platform having a ground-engaging wheel thereon adjacent one side thereof and intermediate its front and rear edges and runners applied to the opposite side of the platform adjacent its front and rear edges, a stationary cutting blade at the front edge of said platform, said blade having its cutting edge disposed between the side edges of the platform and being curved laterally and rearwardly thereof, and a cooperating rotatable blade journaled on the platform to revolve about a vertical axis over said stationary blade.

2. A lawn trimming tool, comprising a platform having a ground-engaging wheel journaled thereon adjacent one side thereof and between its front and rear edges, ground-engaging runners applied to the opposite side of the platform adjacent its front and rear edges, the front edge of the platform having a cutting edge thereon between the side edges thereof, an upright shaft journaled at the front end of said platform and having a revolvable cutting blade thereon in cooperative relation with said platform cutting edge, and means for connecting said shaft in driving engagement with said ground-engaging wheel.

3. An edge-trimming tool for lawns, comprising a platform having a ground-engaging wheel disposed rearwardly of its front edge, said front edge having between the side edges of the platform a cutting edge extending in an arcuate path transversely and rearwardly of the platform, a revolving cutting blade journaled on a vertical axis at the front end of said platform in cooperative relation with its cutting edge, and motion transmitting means connecting said revolving cutting blade with said ground-engaging wheel.

EDWARD W. BOWERS.